United States Patent [19]

Masuyama et al.

[11] Patent Number: 6,163,882
[45] Date of Patent: Dec. 19, 2000

[54] LANGUAGE PROCESSING APPARATUS FOR CONVERTING SOURCE PROGRAM INTO OBJECT PROGRAM

[75] Inventors: Hiroyuki Masuyama; Takako Fukuda, both of Tokyo, Japan

[73] Assignee: NEC Corporation, Tokyo, Japan

[21] Appl. No.: 09/054,409

[22] Filed: Apr. 3, 1998

[30] Foreign Application Priority Data

Apr. 3, 1997 [JP] Japan .................................... 9-085083

[51] Int. Cl.[7] .................................................. G06F 9/45
[52] U.S. Cl. ............................................................ 717/9
[58] Field of Search ..................................... 717/9

[56] References Cited

U.S. PATENT DOCUMENTS 5,043,870  8/1991  Ditzel et al. ................................ 717/9

FOREIGN PATENT DOCUMENTS 5-94311  4/1993  Japan .
9-34725  2/1997  Japan .

OTHER PUBLICATIONS

Dietrich, S., Shortest path by Approximation in Logic Programs, ACM, p. 119–137, 1992.
Frederickson, G., A New Approach to All Pairs Shortest Paths in Planar Graphics, ACM, p. 19–28, 1987.
Fraser et al., Automatic Generation of Fast Optimizing Code Generators, ACM, p. 79–84, 1988.
Vegdahl, The Design of an Interactive Compiler for Optimizing Microprograms, ACM, p. 129–135, 1985.

*Primary Examiner*—Kakali Chaki
*Assistant Examiner*—John Q. Chavis
*Attorney, Agent, or Firm*—Foley & Lardner

[57] ABSTRACT

For converting a source program into an object program, the source program is analyzed to individually detect a plurality of functions, and the called relationship between the functions is detected. An array of functions with many calls at shorter distances is generated, and the order of the functions is changed to the generated array, for thereby generating the object program in a form having many calls at shorter distances. The object program which is small in capacity and high at processing speed can be generated from the source program which has been generated without taking special considerations.

16 Claims, 11 Drawing Sheets

| func_2 | 2 |
|---|---|
| 30KB | |
| 1 | 15KB |
| 1 | 25KB |

FIG. 4d

| func_3 | 3 |
|---|---|
| 30KB | |
| 1 | 10KB |

FIG. 4b

| func_1 | 1 |
|---|---|
| 20KB | |
| 3 | 5KB |
| 3 | 10KB |
| 3 | 15KB |

FIG. 4a
FUNCTION INFORMATION ~21

| FUNCTION NAME | FUNCTION NUMBER |
|---|---|
| FUNCTION SIZE | |
| CALLED FUNCTION NUMBER | OFFSET FROM LEADING END |
| --- | --- |
| CALLED FUNCTION NUMBER | OFFSET FROM LEADING END |

FIG. 5a

FUNCTION CALL INFORMATION ⟵ 22

| FUNCTION NUMBER | NUMBER OF CALLS |
|---|---|

FIG. 5b

| 1 | 3 |
|---|---|
| 2 | 0 |
| 3 | 3 |

FIG. 6a

FUNCTION MUTUAL CALL INFORMATION ⟵ 23

| FUNCTION NUMBER | NUMBER OF MUTUAL CALLS | FUNCTION POSITION |
|---|---|---|

FIG. 6b

| 1 | 6 | 1 |
|---|---|---|
| 2 | 2 | 3 |
| 3 | 4 | 2 |

LANGUAGE PROCESSING APPARATUS FOR CONVERTING SOURCE PROGRAM INTO OBJECT PROGRAM

BACKGROUND OF THE INVENTION

1. Field of the Invention

The present invention relates to a language processing apparatus for converting a source program into an object program.

2. Description of the Related Art

For generating an object program for use in a computer system, it has been customary for a programmer to manually describe a source program and then for a language processing apparatus to convert the source program into an object program.

The language processing apparatus comprises a computer system which is operated by a compiler program, and converts the source program into the object program according to an appropriate algorithm.

Figure 1:
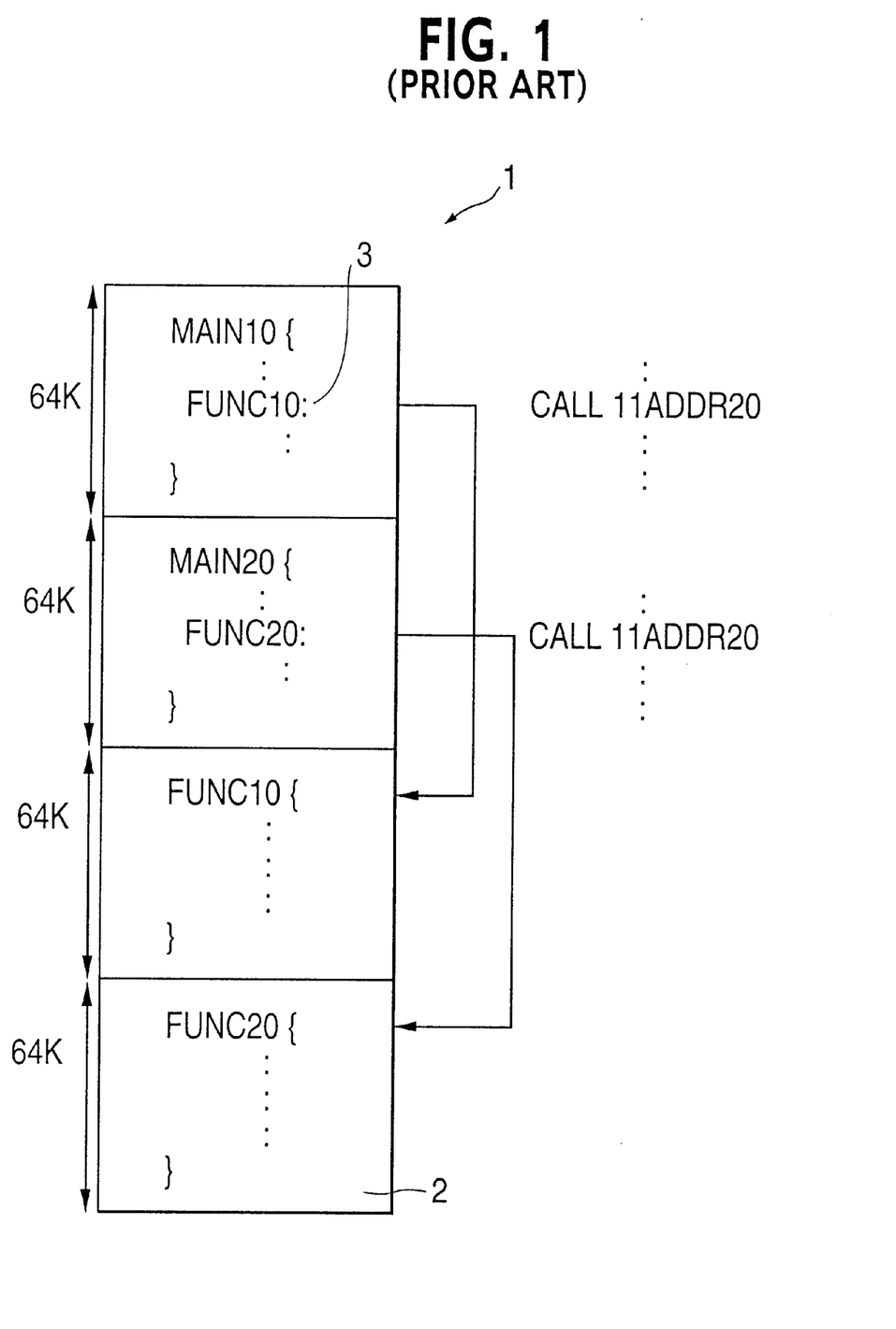
FIG. 1 is a diagram showing a conventional logical structure of a source program.

As shown in FIG. 1 of the accompanying drawings, a source program 1 is generally of a structure having an array of functions 2 each containing a call instruction 3 described therein for calling another function 2.

When the source program 1 is converted into an object program by a language processing apparatus, the language processing apparatus executes a converting process with respect to each of the functions 2. Since the sequence of the functions 2 and the mutual calling relationship thereof are not changed while the source program 1 is being converted into an object program, the generated object program is of a structure which contains the functions 2 arranged in the same sequence as with the source program 1.

While the above language processing apparatus can convert a source program into an object program, the efficiency with which the functions 2 are called may be low because the sequence of the functions 2 in the generated object program is the same as that in the source program 1.

For example, when a certain function calls another function in an object program written in the language C, the function is called by different calls depending on the distance to the function. For example, if the distance across which the function is called is smaller than 64 kilobytes, then a relative branch call is executed, and if the distance across which the function is called is greater than 64 kilobytes, then an absolute address call is executed.

Since the absolute address call requires a longer call instruction code and is executed at a lower speed than the relative branch call, an object program with many absolute address calls is large in capacity and heavy. It would be practically difficult for the programmer to take special considerations to generate a source program containing relative branch calls as most function calls. Therefore, object programs of large capacity and low speed are actually generated.

SUMMARY OF THE INVENTION

It is an object of the present invention to provide a language processing apparatus for converting a source program which has been generated with special considerations into an object program which is of small capacity and high speed.

The principles of the present invention are applicable to source and object programs each of such a structure that a call instruction for calling another function is established in at least some of a plurality of successive functions, at least the object program having functions that are called by different calls depending on the distance.

In a language processing apparatus according to the present invention, for converting a source program composed of a plurality of successive functions which at least partly include call instructions for calling other functions into an object program composed of functions called by different calls depending on the distance thereof, function detecting means analyzes the source program to individually detect a plurality of functions, and call detecting means detects the called relationship of the detected functions.

Based on the called relationship which is detected, array generating means generates an array of functions with a number of calls at shorter distances. The order of functions is changed into the generated array by array changing means. Therefore, the object program is generated in a form having a number of calls at shorter distances by the changed order. Consequently, it is possible to generate an object program which is small in capacity and high at processing speed from a source program which has been generated without taking special considerations.

The call detecting means may detect the number of times that each of the functions detected by the function detecting means call other functions, and the number of times that each of the functions detected by the function detecting means is called by other functions, and calculate the sum of the detected numbers. The array generating means may generate an array of functions in which a function with a greater sum calculated by the call detecting means is positioned more closely to the center of the array.

Inasmuch as an object program is generated in a form in which functions with more mutual calls are positioned more closely to the center of the array, it is possible to generate, through a simple process, an object program with a high possibility for many calls at shorter distances.

The array generating means may comprise size comparing means for comparing sizes of functions which have first and second largest sums calculated by the call detecting means, and function locating means for positioning the function of the smaller size above the function of the greater size.

When the array generating means positions functions depending on the number of calls, the sizes of functions which have first and second largest sums are compared with each other by the size comparing means, and the function of the smaller size is positioned above the function of the greater size by the function locating means.

Because the possibility for the functions which have first and second largest sums to be positioned in a form with many calls at shorter distances is increased, it is possible to generate, through a simple process, an object program with a high possibility for many calls at shorter distances.

For example, if the numbers of times that three functions are called are in the order of "1-2-3", then when the function that is called the maximum number "1" of times is positioned at the center of the array, the three functions may be arrayed as "2-1-3" or "3-1-2".

While a call instruction may be positioned arbitrarily in each of the functions, the position where a function is called is at the leading end of the function. When two functions mutually call each other, it is highly possible for many calls to be made at small distances if the function of the greater size is positioned below the function of the smaller size.

By comparing the sizes of functions which have first and second largest sums with each other and positioning the function of the smaller size above the function of the greater size, as described above, it can be expected that many calls will be made at small distances.

In another language processing apparatus according to the present invention, for converting a source program into an object program, function detecting means analyzes the source program to individually detect a plurality of functions, and call generating means generates various different arrays of the detected functions.

The second language processing apparatus also has number accumulating means for accumulating the numbers of calls at shorter distances in each of the generated arrays, array selecting means for selecting an array whose accumulated number of calls is the largest, and array changing means for changing the order of functions into the selected array. Therefore, the object program is generated in a form having a number of calls at shorter distances by the changed order.

Inasmuch as the order of functions is actually changed to select an array whose number of calls at shorter distances is the largest, it is possible to generate an object program with a greatest number of calls at shorter distances. Consequently, it is possible to generate an object program which is small in capacity and high at processing speed from a source program which has been generated without taking special considerations.

In a method of processing a language according to the present invention, a source program is analyzed to individually detect a plurality of functions, the called relationship of the detected functions is detected, an array of functions with many calls at shorter distances is generated on the basis of the called relationship which is detected, and the order of functions is changed into the generated array.

For converting the source program into an object program, the object program is generated in a form having a number of calls at shorter distances. Consequently, it is possible to generate an object program which is small in capacity and high at processing speed from a source program which has been generated without taking special considerations.

In another method of processing a language according to the present invention, a source program is analyzed to individually detect a plurality of functions, the number of times that each of the detected functions call other functions, and the number of times that each of the detected functions is called by other functions are detected, and the sum of the detected numbers is calculated. Thereafter, an array of functions in which a function with a greater calculated sum is positioned more closely to the center of the array is generated, and the order of functions is changed into the generated array.

Since a function whose sum of the detected numbers is greater in the object program is positioned more closely to the center of the array, the object program has many calls at shorter distances.

As an object program is generated in a form in which functions with more mutual calls are positioned more closely to the center of the array, it is possible to generate an object program with a greater possibility for many calls at shorter distances. Consequently, it is possible to generate an object program which is small in capacity and high at processing speed from a source program which has been generated without taking special considerations.

In still another method of processing a language according to the present invention, a source program is analyzed to individually detect a plurality of functions, various different arrays of functions are generated, the numbers of calls at shorter distances in each of the generated arrays are accumulated, an array whose accumulated number of calls is the largest is selected, and the order of functions is changed into the selected array.

For converting the source program into an object program, the object program is generated in a form having a number of calls at shorter distances by the changed order.

Inasmuch as the order of functions is actually changed to select an array whose number of calls at shorter distances is the largest, it is possible to generate an object program with a greatest number of calls at shorter distances. Consequently, it is possible to generate an object program which is small in capacity and high at processing speed from a source program which has been generated without taking special considerations.

An information storage medium according to the present invention stores a program readable by a computer. The program is capable of controlling the computer to analyze a source program to individually detect a plurality of functions, detect the called relationship of the detected functions, generate an array of functions with many calls at shorter distances on the basis of the called relationship which is detected, and change the order of functions into the generated array.

The computer which reads the program from the information storage medium and operates according to the program functions as a language processing apparatus for converting a source program into an object program.

When the computer operates according to the program, it analyzes a source program to individually detect a plurality of functions, and detects the called relationship of the detected functions. The computer then generates an array of functions with many calls at shorter distances on the basis of the called relationship which is detected, and changes the order of functions into the generated array.

The object program converted from the source program is generated in a form having a number of calls at shorter distances by the changed order. Therefore, it is possible to generate an object program which is small in capacity and high at processing speed from a source program which has been generated without taking special a considerations.

Another information storage medium according to the present invention stores a program readable by a computer. The program is capable of controlling the computer to analyze a source program to individually detect a plurality of functions, detect the number of times that each of the detected functions call other functions, and the number of times that each of the detected functions is called by other functions, calculate the sum of the detected numbers, generate an array of functions in which a function with a greater calculated sum is positioned more closely to the center of the array, and change the order of functions into the generated array.

The computer which reads the program from the above information storage medium and operates according to the program functions as a language processing apparatus for converting a source program into an object program.

When the computer operates according to the program, it analyzes a source program to individually detect a plurality of functions, and detects the number of times that each of the detected functions call other functions, and the number of times that each of the detected functions is called by other functions, and calculates the sum of the detected numbers. The computer then generates an array of functions in which a function with a greater calculated sum is positioned more closely to the center of the array, and changes the order of functions into the generated array.

The object program converted from the source program is generated in a form in which a function with a greater sum is positioned more closely to the center of the array. Therefore, the object program has many calls at shorter distances.

Inasmuch as functions with many mutual calls are positioned more closely to the center of the array, it is possible to generate, through a simple process, an object program with a high possibility for a large number of calls at shorter distances. Consequently, it is possible to generate an object program which is small in capacity and high at processing speed from a source program which has been generated without taking special considerations.

Still another information storage medium according to the present invention stores a program readable by a computer. The program is capable of controlling the computer to analyze a source program to individually detect a plurality of functions, generate various different arrays of functions, accumulate the numbers of calls at shorter distances in each of the generated arrays, select an array whose accumulated number of calls is the largest, and change the order of functions into the selected array.

The computer which reads the program from the above information storage medium and operates according to the program functions as a language processing apparatus for converting a source program into an object program.

When the computer operates according to the program, it analyzes a source program to individually detect a plurality of functions, generates various different arrays of functions, accumulates the numbers of calls at shorter distances in each of the generated arrays, selects an array whose accumulated number of calls is the largest, and changes the order of functions into the selected array.

The object program converted from the source program is generated in a form having a number of calls at shorter distances by the changed order.

Inasmuch as the order of functions is actually changed to select an array whose number of calls at shorter distances is the largest, it is possible to generate an object program with a greatest number of calls at shorter distances. Consequently, it is possible to generate an object program which is small in capacity and high at processing speed from a source program which has been generated without taking special considerations.

The language processing apparatus according to the present invention may be any apparatus for converting a source program into an object program. For example, the language processing apparatus may be implemented by a computer which is operated by a compiler or assembler program.

The various means referred to above may be implemented in various ways insofar as their functions can be performed. For example, the various means may be implemented by dedicated hardware arrangements, a computer which is run by programs to perform the desired functions, functions established in a computer by suitable programs, or their combination.

Different calls depending on the call distance include relative branch calls and absolute address calls in an object program written in language C, for example.

The above and other objects, features, and advantages of the present invention will become apparent from the following description with reference to the accompanying drawings which illustrate examples of the present invention.

DETAILED DESCRIPTION OF THE PREFERRED EMBODIMENTS

A language processing apparatus according to a first embodiment of the present invention will be described below with reference to FIGS. 2 through 9. Those parts of the first embodiment which are identical to those of the conventional logical structure are denoted by identical reference numerals, and will not be described in detail.

Figure 3:
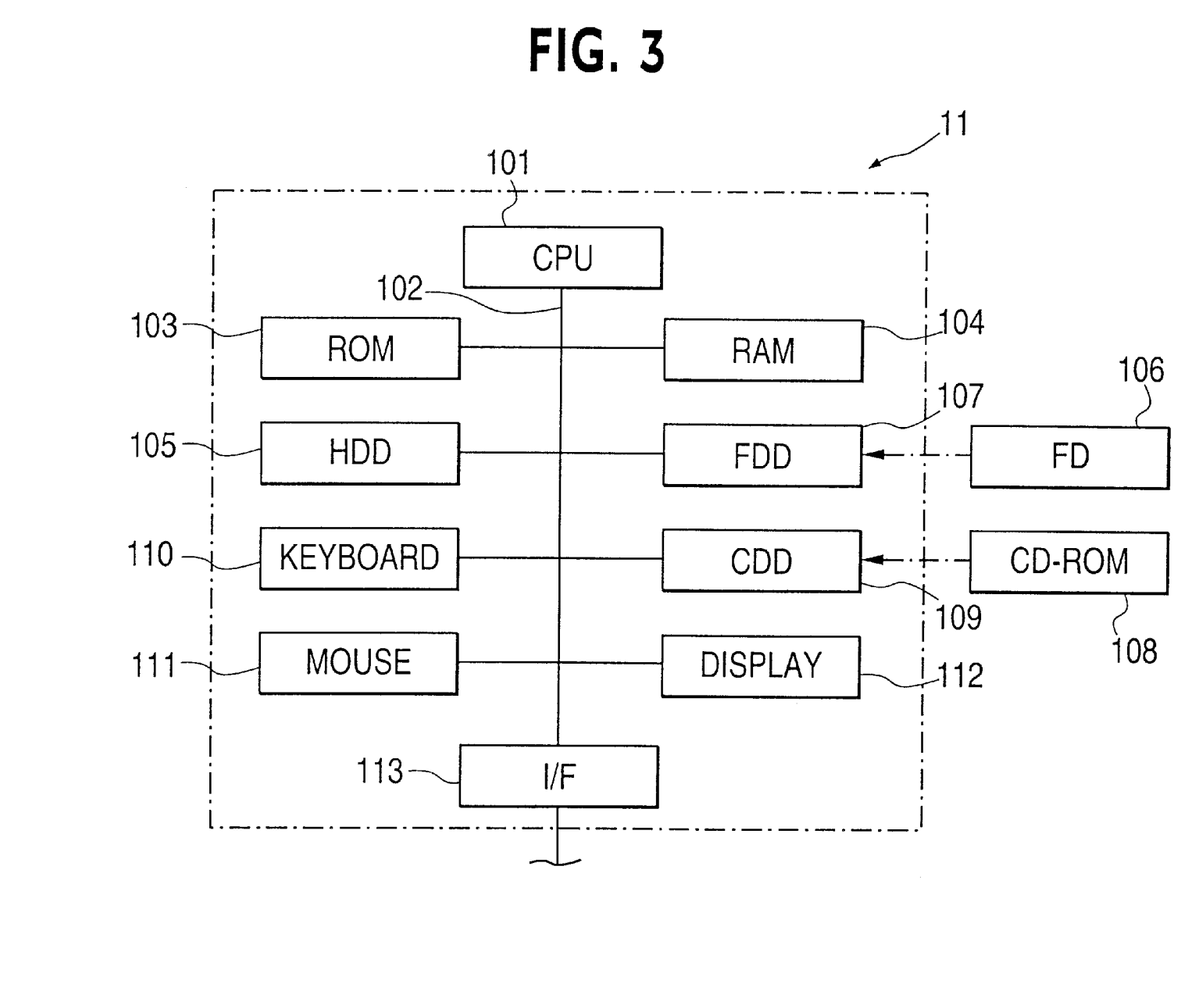
FIG. 3 is a block diagram of a physical structure of a language processing apparatus according to the first embodiment.
Figure 4A:
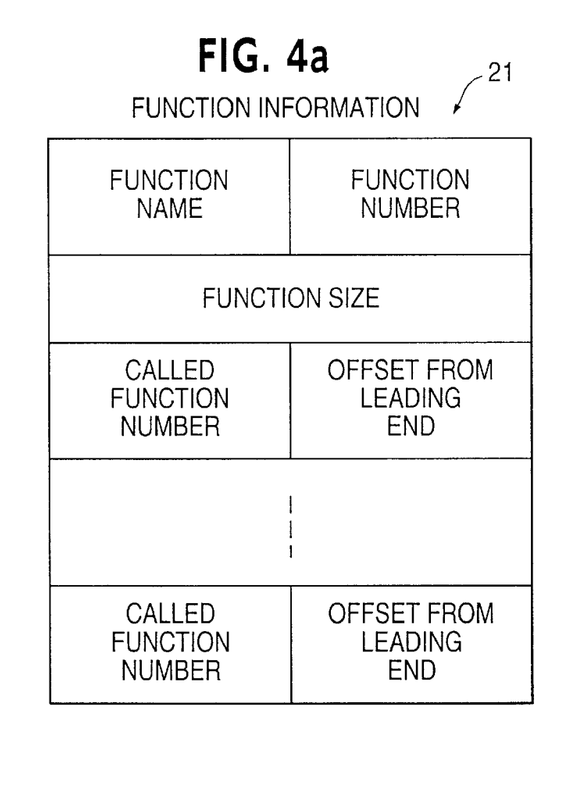
FIGS. 4a, 4b, 4c, and 4d are diagrams showing storage structures of a function information storage unit.
Figure 4B:
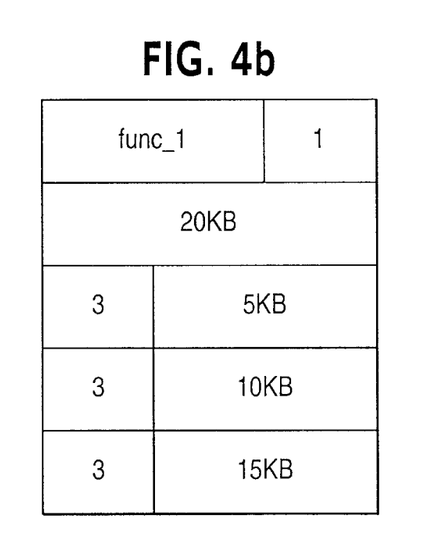
Figure 4C:
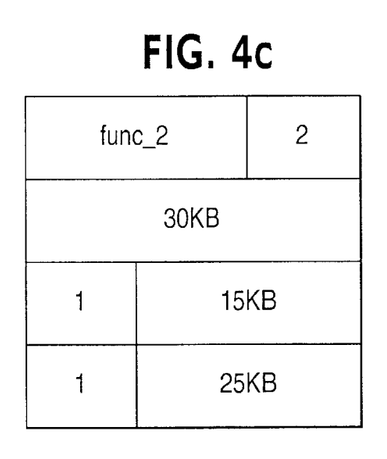
Figure 4D:
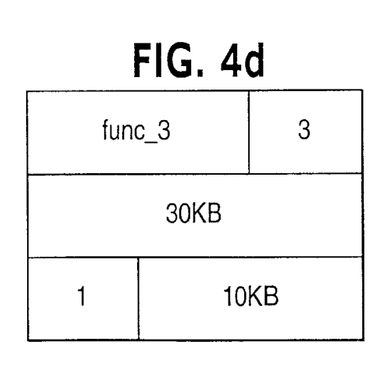

As shown in FIG. 3, the language processing apparatus, generally denoted by 11, according to the first embodiment comprises a workstation which is operated by UNIX as an operating system, and has a CPU (Central Processing Unit) 101.

The CPU 101 is connected to a bus 102 to which there are connected a ROM (Read-Only Memory) 103, a RAM (Random-Access Memory) 104, a HDD (Hard Disk Drive) 105, a FDD (Floppy Disk Drive) 107 for being loaded with a FD (Floppy Disk) 106, a CD (Compact Disc) drive 109 for being loaded with a CD-ROM 108, a keyboard 110, a mouse 111, a display unit 112, and a communication I/F (InterFace) 113.

The ROM 103, the RAM 104, the HDD 105, the FD 106, and the CD-ROM 108 serve as information storage mediums which store various programs as software.

For example, control programs for enabling the CPU 101 to perform various processing operations are stored in the FD 106 or the CD-ROM 108.

The software programs are installed in the HDD 105. When the language processing apparatus 11 starts up, the installed software programs are copied to the RAM 104, and read by the CPU 101.

When the CPU 101 reads the software programs and executes various processing operations, the language processing apparatus 11 perform various functions as corresponding various means.

Figure 2:
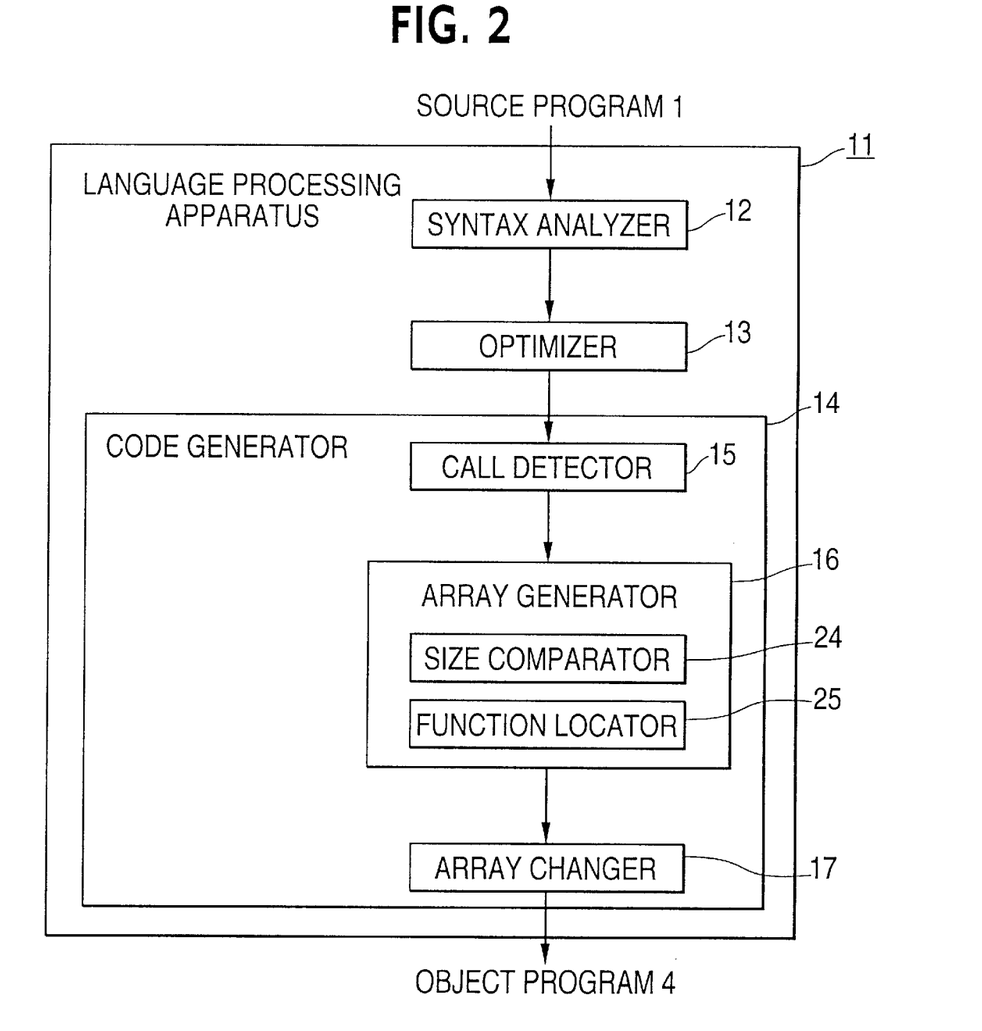
FIG. 2 is a block diagram of a logical structure of a language processing apparatus according to a first embodiment of the present invention.

As shown in FIG. 2, the language processing apparatus 11 logically has, as such various means, a syntax analyzer 12 corresponding to a function detecting means, an optimizer 13, and a code generator 14 corresponding to a program converting means.

The code generator 14 logically includes a call detector 15 as a call detecting means, an array generator 16 as an array generating means, and an array changer 17 as an array changing means.

When the CPU 101 executes a given processing operation according to the control programs stored in the RAM 104, the syntax analyzer 12 analyzes the syntax of a source program 1 according to an existing algorithm to individually detect a plurality of functions 2.

Similarly, when the CPU 101 executes given processing operations according to the control programs stored in the RAM 104, the optimizer 13 and the code generator 14 perform their functions.

The optimizer 13 optimizes the analyzed source program 1 for generating an object program 4 in an optimum form.

The code generator 14 generates codes of the object program 4 from the result of analyzing the source program 1.

When the source program 1 is converted into the object program 4 by the above generation of codes, the call detector 15, the array generator 16, and the array changer 17 of the code generator 14 change the array of functions 2 into an optimum form.

Specifically, the call detector 15 detects the called relationship of plural functions 2 from the source program 1, and stores the detected called relationship into various storage units 21, 22, 23 (see FIGS. 4a–4d, 5a, 5b, 6a, and 6b) which comprise storage areas in the RAM 104.

More specifically, the call detector 15 has a function information storage unit 21, a call information storage unit 22, and a mutual information storage unit 23.

As shown in FIG. 4a–4d, the function information storage unit 21 stores the sizes of functions 2, the numbers of other functions 2 to be called, and the distances from the leading ends of call instructions, using function names and numbers as identification information.

Figure 5A:
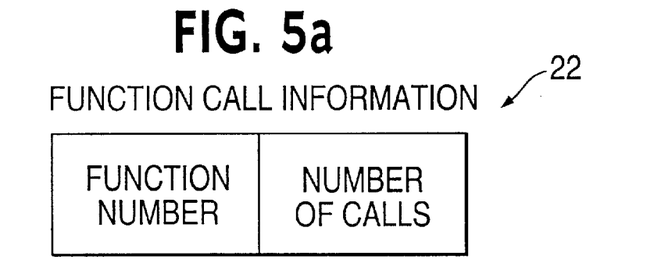
FIGS. 5a and 5b are diagrams showing storage structures of a call information storage unit.
Figure 5B:
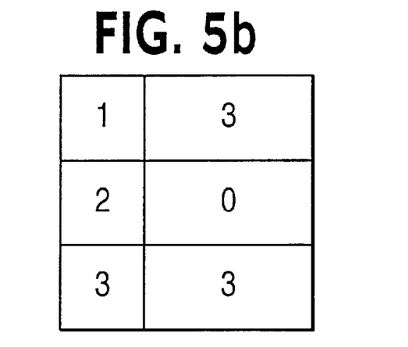

As shown in FIGS. 5a and 5b, the call information storage unit 22 stores the numbers of times that functions 2 are called by other functions, using function numbers as identification information.

Figure 6A:
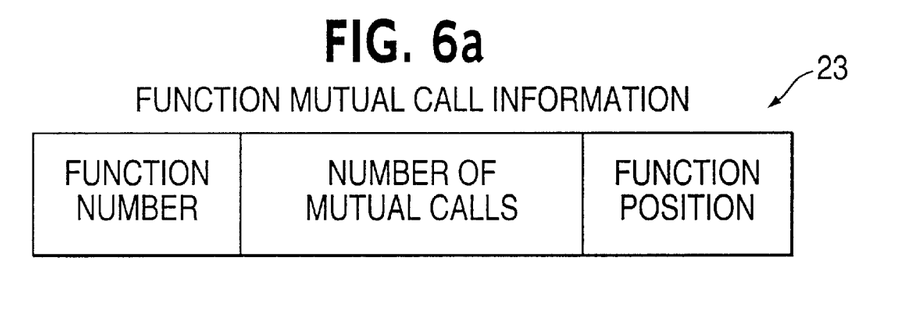
FIGS. 6a and 6b are diagrams showing storage structures of a mutual information storage unit.
Figure 6B:
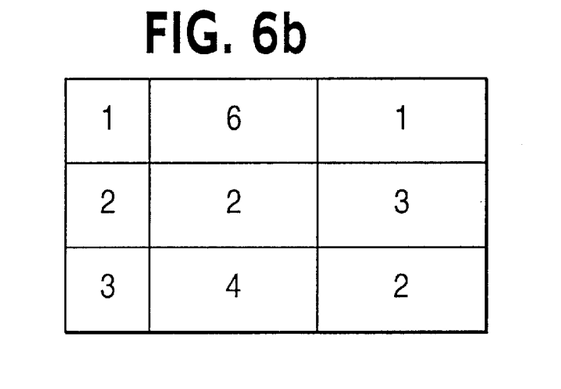

As shown in FIGS. 6a and 6b, the mutual information storage unit 23 stores the numbers and order of mutual calls, using function numbers as identification information.

The numbers of mutual calls are the sums of the numbers of times that functions 2 call other functions and the numbers of times that functions 2 are called by other functions, and the order is a descending order of numbers of mutual calls.

The array generator 16 generates an array of functions with many numbers of calls at shorter distances, based on the called relationship detected by the call detector 15.

More specifically, since the call detector 15 has detected the numbers of mutual calls with respect to many functions of the source program 1 and generated an order, the array generator 16 generates an array of functions such that a function 2 with a greater number of mutual calls will be positioned more closely to the center of the array.

For example, a function 2 which is the first in the order of mutual calls is positioned at the center of the array, and second and subsequent functions 2 are positioned above and below the first function 2 at the center. A second function 2 may be positioned above or below the first function 2.

In order to determine whether the second function 2 is to be positioned above or below the first function 2, the array generator 16 has, as shown in FIG. 2, a size comparator 24 as a size comparing means and a function locator 25 as a function locating means.

The size comparator 24 compares the sizes of functions 2 whose numbers of mutual calls are the first largest and the second largest. The function locator 25 positions the function 2 of the smaller size above the function of the greater size.

The array changer 17 changes the order of functions into the array generated by the array generator 16, thereby generating an object program 4 from the source program 1.

The object program thus generated is stored into a storage area of the RAM 104 by a program outputting means (not shown), and displayed on the display unit 112.

The above functions are performed using hardware units such as the keyboard 110 and the display unit 112, when necessary, and are mainly performed when the CPU 101 operates according to software programs stored in the RAM 104.

Such software programs are stored as control programs in information storage mediums such as the RAM 104, for enabling the CPU 101 to analyze the syntax of the source program 1 and individually detect a plurality of functions 2, optimize the analyzed source program I such that an object program 4 will be generated in an optimum form, and generate codes of the object program 4 from the result of analyzing the optimized source program 1.

To the software programs for generating an object program 4 from a source program 1, there are added control programs for enabling the CPU 101 to detect the called relationship of plural functions 2 from the source program 1 and store the detected called relationship into storage areas of the RAM 14, generate an array of functions 2 with many numbers of calls at shorter distances based on the called relationship thus detected, and change the order of functions into the generated array for thereby generating an object program 4.

The software program for generating an array of functions 2 with many numbers of calls at shorter distances is formed as a control program for enabling the CPU 101 to generate an array of functions 2 such that a function 2 with a greater number of mutual calls will be positioned more closely to the center of the array, for example.

To this software program, there are added control programs for enabling the CPU 101 to compare the sizes of functions 2 whose numbers of mutual calls are the first largest and the second largest, and position the function 2 of the smaller size above the function of the greater size.

A language processing method carried out by the language processing apparatus 11 will be described below with reference to FIGS. 7 and 8.

The programmer (not shown) manually operates the keyboard 110 while visually confirming images displayed on the display unit 112 of the language processing apparatus 11 to generate a source program 1, and store the generated source program 1 into the RAM 104.

When the programmer instructs the language processing apparatus 11 to compile the source program 1 through language processing, the language processing apparatus 11 converts the source program 1 stored in the RAM 104 into an object program 4.

Figure 9A:
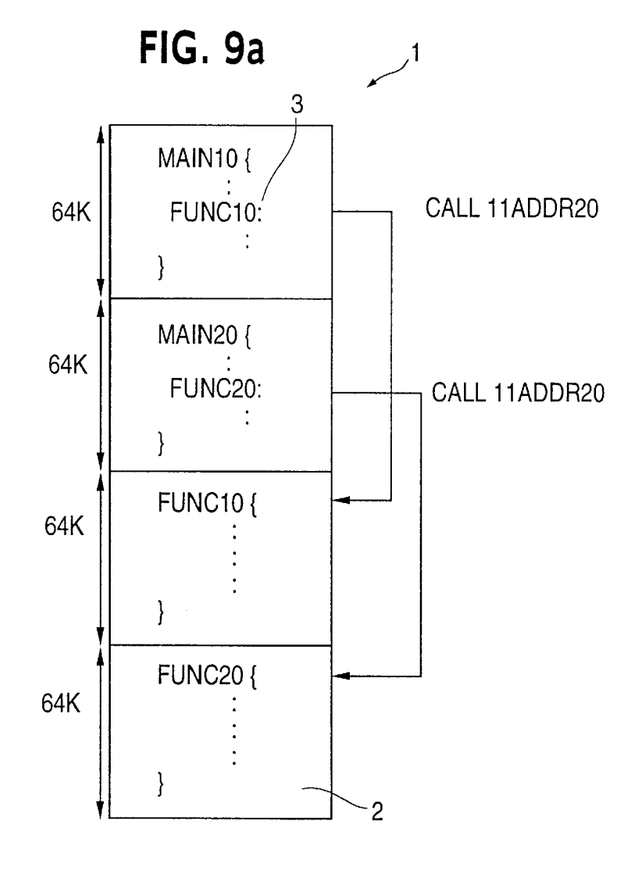
FIGS. 9a and 9b are diagrams showing logical structures of source and object programs.
Figure 9B:
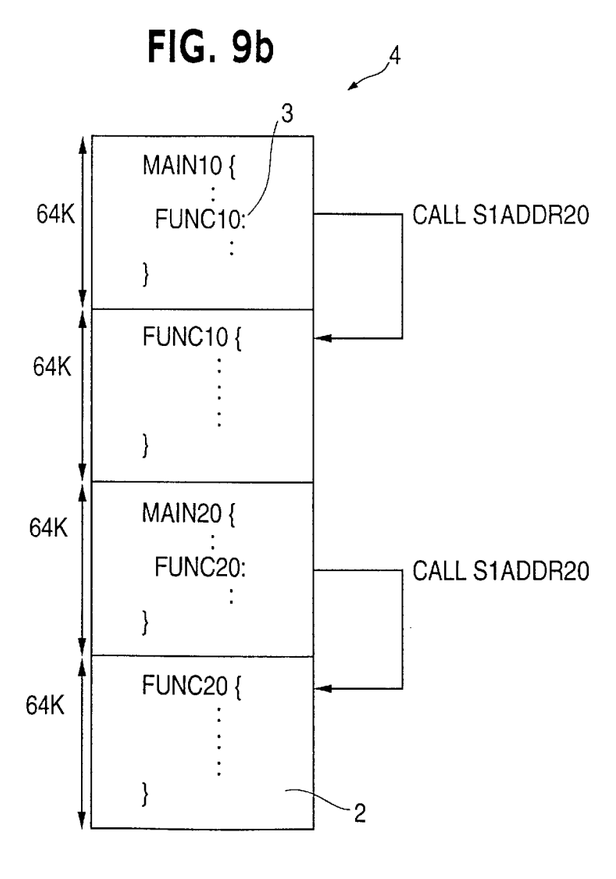

As shown in FIGS. 9a and 9b, the source program 1 and the object program 4 are of logical structures comprising an array of successive functions 2, at least some of which have call instructions for calling other functions 2.

At least the object program 4 has functions 2 that are called by different calls depending on the distance, such as relative branch calls and absolute address calls as in the language C.

Figure 7:
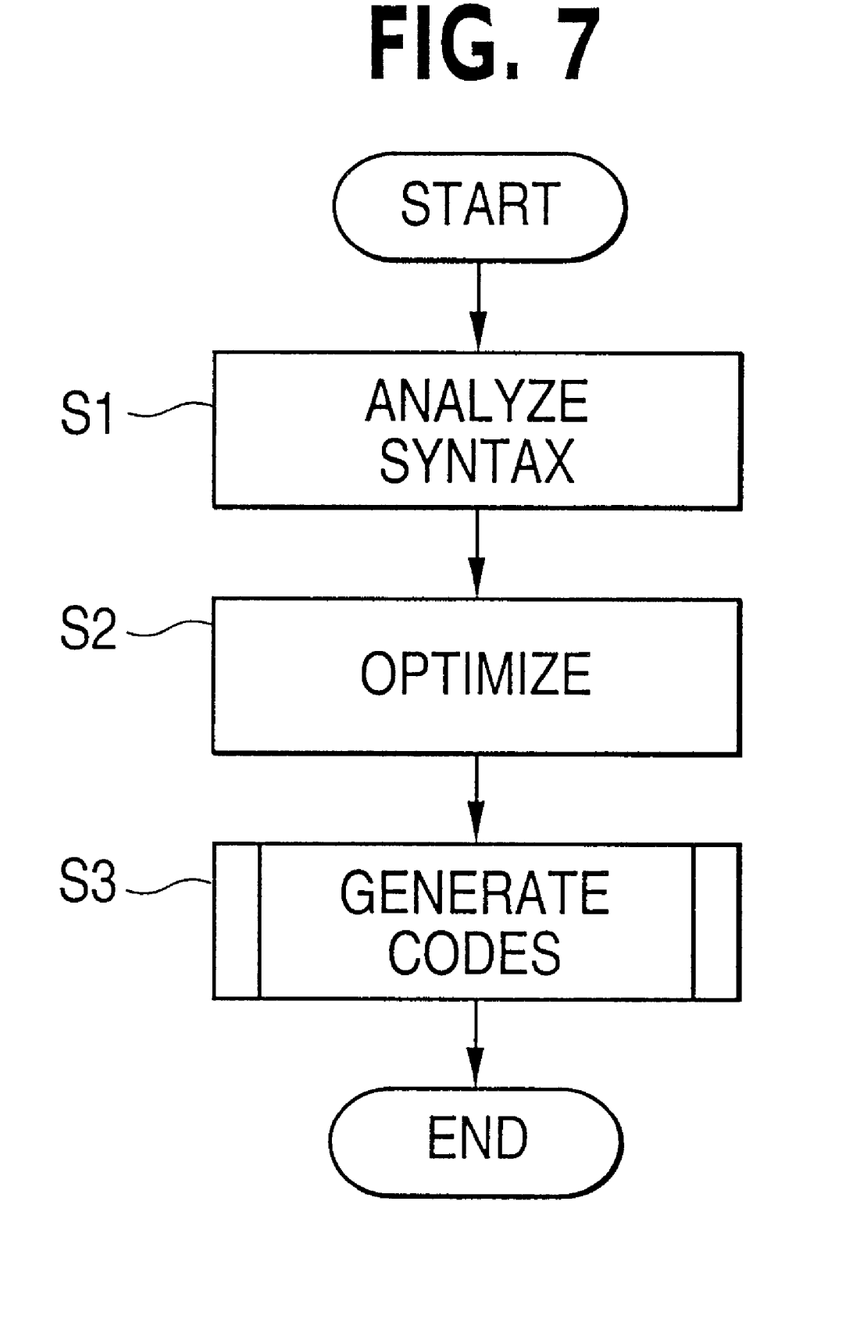
FIG. 7 is a flowchart of a main routine of a language processing method carried out by the language processing apparatus according to the first embodiment.

As shown in FIG. 7, the syntax of the source program 1 is analyzed by the syntax analyzer 12 according to a predetermined algorithm to individually detect a plurality of functions 2 in a step S1. Then, the source program 1 is optimized by the optimizer 13 such that an object program 4 will be generated in an optimum form in a step S2.

From the result of analyzing the optimized source program 1, various codes of the object program 4 are generated by the code generator 14 in a step S3.

When the source program 1 is converted into the object program 4 through the generation of codes, the array of functions 2 is changed by the call detector 15, the array generator 16, and the array changer 17 of the code generator 14.

Figure 8:
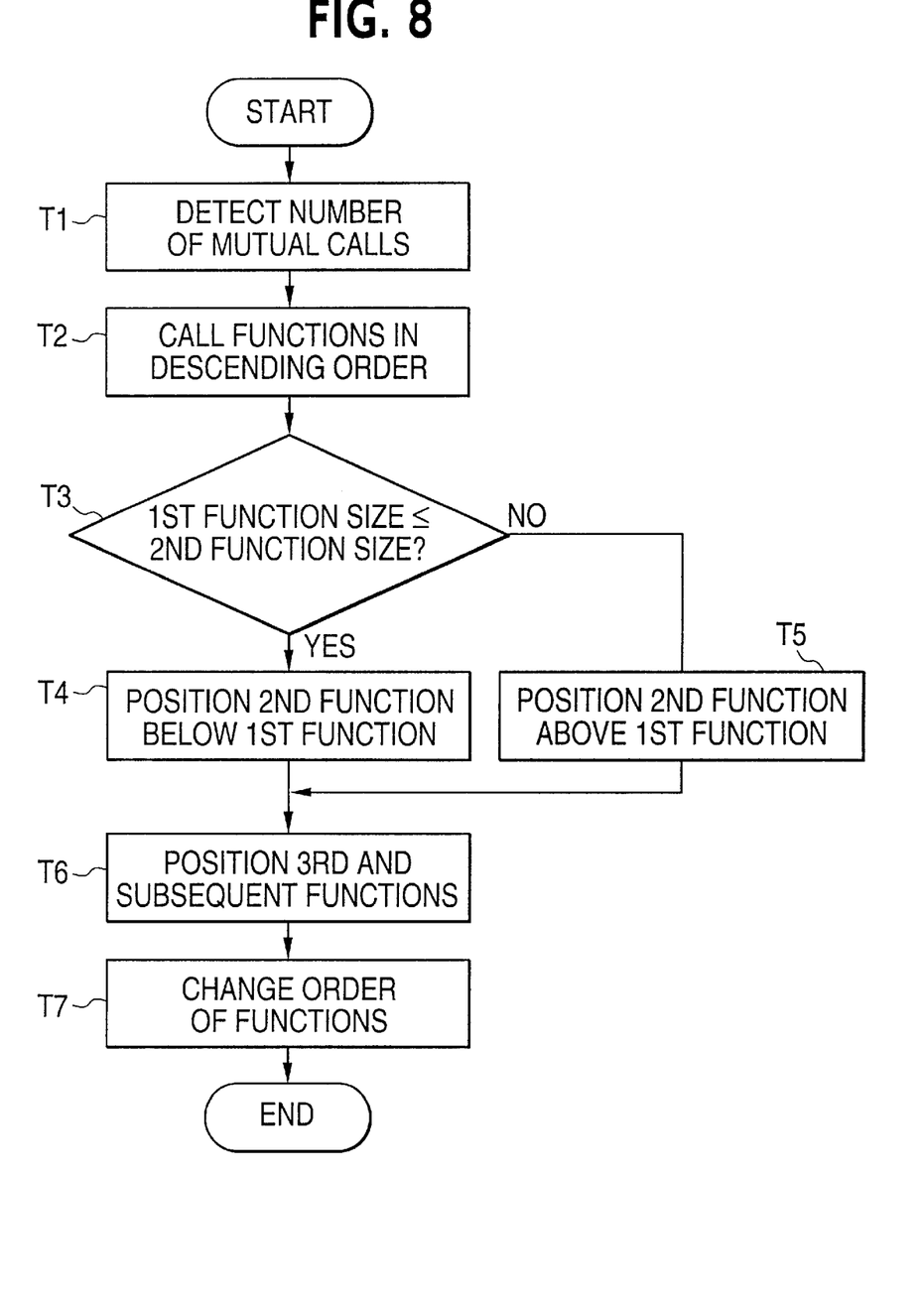
FIG. 8 is a flowchart of a subroutine of a code generating process.

Specifically, as shown in FIG. 8, the call detector 15 detects the called relationship of plural functions 2 from the source program 1, and stores the numbers of mutual calls of all the functions 2 into the mutual information storage unit 23 in a step T1.

The numbers of mutual calls are calculated as the sums of the numbers of times that functions 2 call other functions and the numbers of times that functions 2 are called by other functions, and the order of mutual calls is generated as a descending order of numbers of mutual calls.

After the order of numbers of mutual calls with respect to many functions 2 of the source program 1 is detected, the array generator 16 successively calls functions according to the order of mutual calls in a step T2.

The size comparator 24 compares the sizes of functions 2 whose numbers of mutual calls are the first largest and the second largest in a step T3. The function locator 25 positions the function 2 of the smaller size above the function of the greater size in steps T4, T5.

For example, if the numbers of times that three functions 2 are called are in the order of "1-2-3", then when the function 2 that is called the maximum number "1" of times is positioned at the center of the array, the three functions 2 may be arrayed as "2-1-3" or "3-1-2".

As shown in FIGS. 9a and 9b, while a call instruction may be positioned arbitrarily in each of the functions 2, the position where a function 2 is called is at the leading end of the function 2.

When two functions 2 mutually call each other, it is highly possible for many calls to be made at small distances if the function 2 of the greater size is positioned below the function 2 of the smaller size.

Consequently, after the sizes of functions 2 whose numbers of mutual calls are the first largest and the second largest are compared with each other, if the function 2 of the smaller size is positioned above the function 2 of the greater size, then it is expected that many calls will be made at small distances.

After the position of the function 2 of the second largest size is determined with respect to the position of the function 2 of the first largest size, the positions of third and subsequent functions 2 are automatically determined in a step T6. The array changer 17 then changes the order of functions 2 according to the determined function positions in a step T7.

The generated object program 4 with the changed array of functions 2 is then stored into the RAM 104, for example, and displayed on the display unit 112.

As described above, for generating an object program 4 from a source program 1, the language processing apparatus 11 changes the array of functions 2 such that a function 2 with a greater number of mutual calls will be positioned more closely to the center of the array, as shown in FIGS. 9a and 9b.

Since the object program 4 thus generated contains many function calls at small call distances, if it is written in language C, then the possibility to execute absolute address calls is lowered, and the possibility to execute relative branch calls is increased.

In the case where functions are called by different calls depending on the call distance, because calls at shorter distances are generally smaller in code length and are executed at higher speeds than calls at longer distances, the language processing apparatus 10 can automatically generate an object program 4 which is high in execution speed and small in capacity from a source program which has been generated without special considerations.

Particularly, the language processing apparatus 10 changes the array of functions 2 such that a function 2 with a greater number of mutual calls will be positioned more closely to the center of the array for thereby increasing the number of calls at shorter distances. Therefore, the language processing apparatus 10 can generate an object program 4 which is high in execution speed and small in capacity, through a simple process at a high speed.

Inasmuch as the sizes of functions 2 whose numbers of mutual calls are the first largest and the second largest are compared with each other, and the function of the smaller size is positioned above the function of the greater size, the possibility for many calls at shorter distances is increased.

However, although the language processing apparatus 10 can increase the possibility for many calls at shorter distances, it may actually not provide many calls at shorter distances.

Specifically, while the language processing apparatus 10 changes the array of many functions 2 depending on the numbers of mutual calls and sizes, the position of a call instruction in each of the functions 2 is arbitrary, as described above.

For example, in the case where a call instruction for calling the first function 2 is positioned below the second function 2, and a call instruction for calling the second function 2 is positioned above the first function 2, call distances will be greater if the first and second functions 2 are located in the order named, and call distances will be smaller if the second and first functions 2 are located in the order named.

The language processing apparatus 11 does not take into account the positions of call instructions in the functions 2. Consequently, the language processing apparatus 11 may not be able to generate an object program 4 which contains many calls at shorter distances.

A language processing apparatus according to a second embodiment of the present invention, which is designed to solve the above problem, will be described below with reference to FIGS. 10 through 12.

Those parts of the language processing apparatus according to the second embodiment which are identical to the language processing apparatus according to the first embodiment are denoted by identical reference numerals, and will not be described in detail below.

Figure 10:
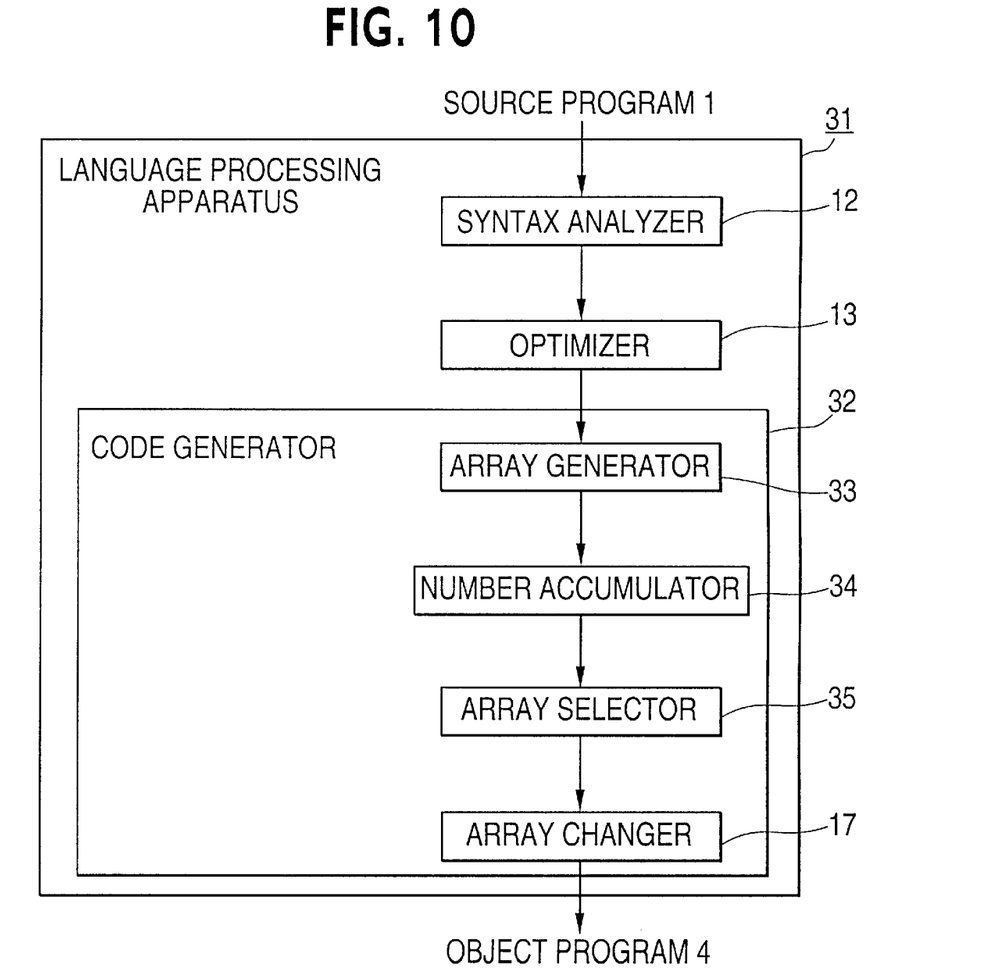
FIG. 10 is a block diagram of a logical structure of a language processing apparatus according to a second embodiment of the present invention.

As shown in FIG. 10, the language processing apparatus, generally denoted by 31, according to the second embodiment logically has a syntax analyzer 12, an optimizer 13, and a code generator 32 as a program converting means.

The code generator 32 has various functions or units 33, 34, 35 which are different from the code generator 14 of the language processing apparatus 11 according to the first embodiment.

Specifically, the code generator 32 has an array generator 33 as an array generating means for generating various different arrays of functions 2 of a source program 1 when the CPU 101 executes a certain processing operation according to a control program stored in the RAM 104.

For example, if three functions 2 indicated respectively by "1-2-3" are detected from the source program 1, the array generator 33 generates arrays of all combinations of functions "1-2-3", "2-1-3", "2-3-1", "3-1-2", "3-2-1".

The code generator 32 has a number accumulator 34 as a number accumulating means for accumulating the numbers of calls at shorter distances in each of the generated arrays when the CPU 101 executes a certain processing operation according to a control program stored in the RAM 104.

For example, if a call distance is less than 32 kilobytes and a relative branch call, which is a call at a shorter distance, is applied, the numbers of calls at shorter distances are accumulated through comparison with such a threshold.

The code generator 32 also has an array selector 35 as an array selecting means for selecting an array whose accumulated number of calls is the largest and outputting the selected array to an array changer 17, which changes the order of functions 2 based on the inputted array.

An array whose accumulated number of calls is the largest may be selected by selecting a maximum one of the accumulated numbers of calls of all the arrays or successively updating an array whose accumulated number of calls is the largest when the number of calls is detected in each of the arrays.

The above functions are performed using various hardware, when necessary, and are mainly performed when the CPU 101 operates according to software programs stored in the RAM 104.

For example, software programs for performing the functions 33–35 are stored as control programs in the RAM 104 for enabling the CPU 101 to generate various different arrays of plural functions 2 of the source program 1, accumulate the numbers of calls at shorter distances in each of the generated arrays, and select and output an array whose accumulated number of calls is the largest.

A language processing method carried out by the language processing apparatus 31 will be described below with reference to FIG. 11.

According to the language processing method carried out by the language processing apparatus 31, the syntax of a source program 1 is analyzed by the syntax analyzer 12, and then the source program 1 is optimized by the optimizer 13. From the result of analyzing the optimized source program 1, the code generator 32 generates an object program 4.

When the source program 1 is converted into the object program 4 by the generation of codes, arrays of functions 2 are changed by the functions or units 33–35, 17.

Figure 11:
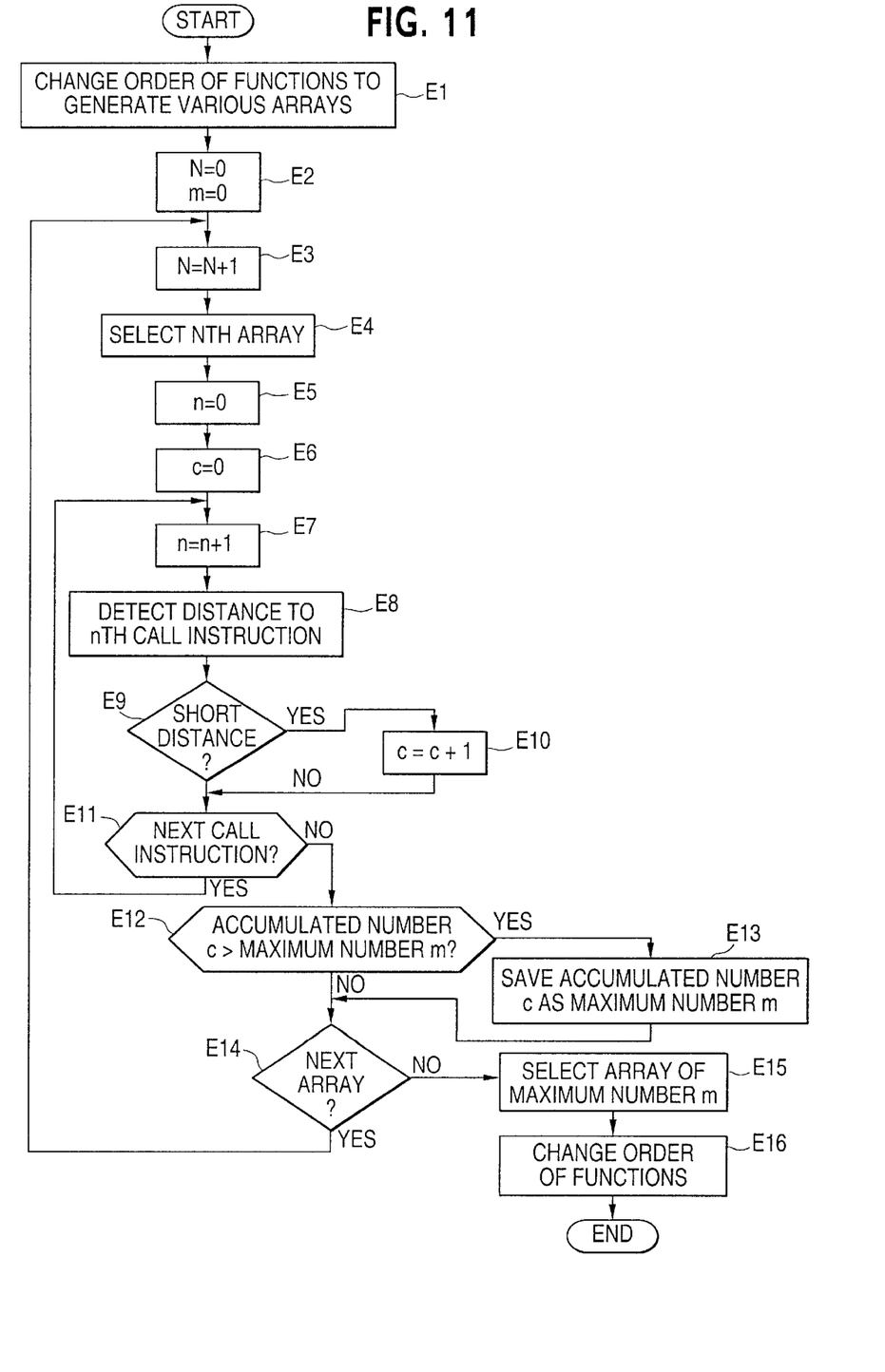
FIG. 11 is a flowchart of a subroutine of a code generating process of a language processing method carried out by the language processing apparatus according to the second embodiment.

As shown in FIG. 11, the array generator 33 generates various different arrays of plural functions 2 of the source program 1 in a step E1, and the arrays are successively selected in steps E2–E4, E14.

When the distances of all calls in a selected Nth array are successively detected in steps E5, E6–E8, E11, the number accumulator 34 decides whether or not each of the detected distances falls in a range to which calls at shorter distances in the object program 4 are applicable in a step E9.

Figure 12:
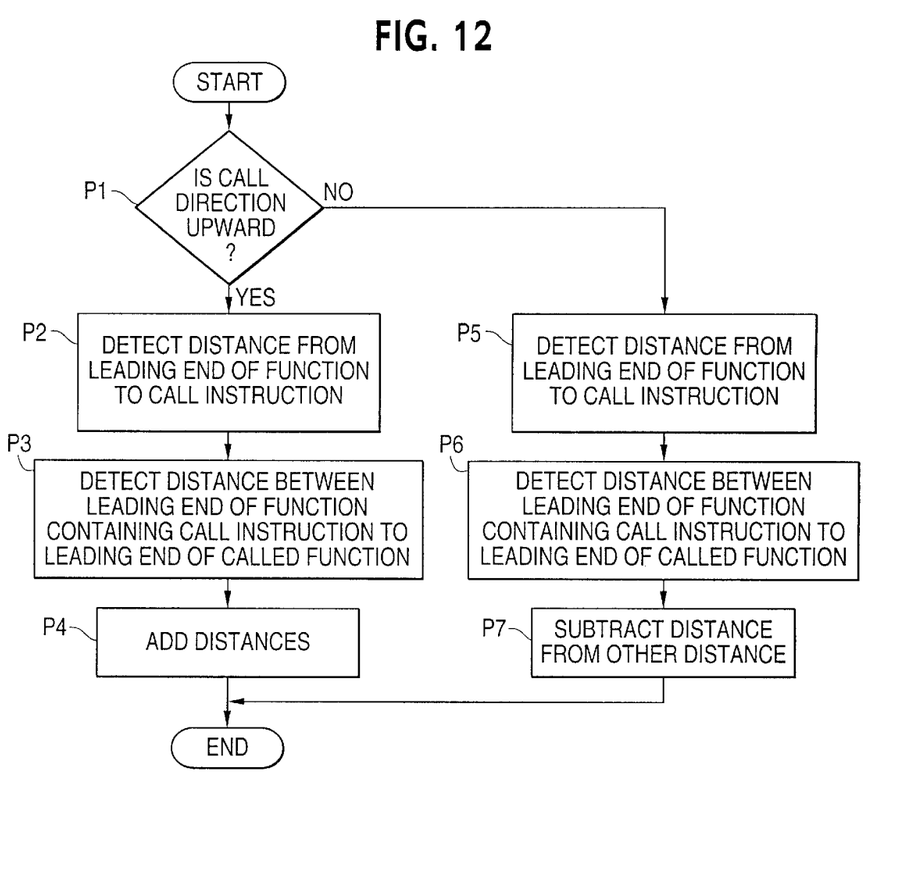
FIG. 12 is a flowchart of a subroutine of a distance detecting process of the language processing method carried out by the language processing apparatus according to the second embodiment.

More specifically, as shown in FIG. 12, the direction of a call for which a distance is to be detected is determined in a step P1, and a call distance is calculated with respect to the determined direction.

For example, if the direction of a call is upward, then the distance from the leading end of the function 2 to the call instruction is detected in a step P2, and the distance between the leading end of the function 2 to which the call instruction belongs and the leading end of a function 2 to be called is detected in a step P3, after which these distances are added in a step P4.

If the direction of a call is downward, then the distance from the leading end of the function 2 to the call instruction is detected in a step P5, and the distance between the leading end of the function 2 to which the call instruction belongs and the leading end of a function 2 to be called is detected in a step P6, after which the former distance is subtracted from the latter distance in a step P7.

The calculated distance is compared with a threshold value. If the distance is smaller than the threshold value, then it is determined that calls at shorter distances are applicable to the distance, and the number c is accumulated in a step E10.

If the distance is greater than the threshold value, then it is determined that calls at shorter distances are not applicable to the distance, and the number c is not accumulated in a step E10.

The number of calls at shorter distances is accumulated with respect to all calls in the Nth array in a step S11.

The accumulated number c and a maximum number m are compared with each other in a step E12. If the accumulated number c is greater than the maximum number m, then the accumulated number c is saved as the maximum number m and the array number N is also saved in a step E13.

The maximum number m thus saved is compared with the latest accumulated number c. Therefore, the maximum accumulated number c detected thus far is saved as the maximum number m.

After the maximum number m has been detected with respect to all arrays in a step E14, the array selector 35 selects the array with the maximum number m in a step E15, and then the array changer 17 changes the order of the functions 2 depending on the selected array in a step E16.

According to the second embodiment, as described above, when the object program 4 is generated from the source program 1, the language processing apparatus 31 generates various different arrays of functions 2, detects the numbers of calls at shorter distances in the generated arrays, and changes the order of the functions into the array with the maximum number of calls.

Since the object program 4 is generated in a form which has the maximum number of calls at shorter distances, the generated object program 4 can be executed at a high speed and has a small capacity.

While the language processing method carried out by the language processing apparatus 31 can reliably generate an object program 4 which has the maximum number of calls at shorter distances, it is required to perform a complex and time-consuming processing sequence because it needs to actually detect distances in all the arrays of functions 2.

The language processing method carried out by the language processing apparatus 11 according to the first embodiment is relatively simple and not time-consuming though it may not reliably generate an object program 4 with many calls at shorter distances.

Therefore, since the language processing methods carried out by the language processing apparatus 11, 31 have both advantages and disadvantages, they should be selected for use after taking into account various conditions including apparatus specifications and use of the object program 4.

In the illustrated embodiments, the source program 1 written in language C is compiled into the object program 4.

However, the principles of the present invention are not limited to language C, but are also applicable various other languages such as FORTRAN, COBOL, etc., and the converting process is not limited to the compiling process, but is applicable to an assembling process.

In the illustrated embodiments, the CPU 101 operates according to control programs stored as software programs in the RAM 104 or the like to perform various functions of the language processing apparatus 11, 31.

However, those various functions may be hardware-implemented, or some of the functions may be stored as software programs in the RAM 104 or the like and the other functions may be implemented as hardware arrangements.

In the illustrated embodiments, when the language processing apparatus 11, 31 start up, software programs stored in the HDD 105 are copied to the RAM 104, and the software programs stored in the RAM 104 are then read by the CPU 101.

However, it is possible for the CPU 101 to utilize the software programs while they remain stored in the HDD 105, and also possible to write the software programs in the ROM 103 in advance.

The software programs may be stored in information storage mediums that can separately be handled, e.g., the FD 106 or the CD-ROM 108, and may be installed from the FD 106 or the CD-ROM 108 into the RAM 104 or the like.

It is also possible for the CPU 101 to directly read the software programs from the FD 106 or the CD-ROM 108 and execute the read software programs, without installing them into the RAM 104.

If the functions of the language processing apparatus 11, 31 are software-implemented, then the software programs may be read and executed by the CPU 101.

Each of the control programs for performing various functions may be in the form of a combination of software programs.

Specifically, an information storage medium as an individual product may store only minimum software programs that are required to perform the functions of the language processing apparatus 11, 31.

For example, if application software programs are supplied from an information storage medium such as the CD-ROM 108 to the language processing apparatus 11, 31 which is operated by an existing operating system, then since the functions of the language processing apparatus 11, 31 are performed by the combination of the application software programs and the operating system, software programs depending on the operating system may be omitted from the application software programs stored in the information storage medium.

The software programs stored in the information storage medium may be supplied to the CPU 101 in various ways which are not limited to direct insertion of the information storage medium into the language processing apparatus 11, 31.

For example, the software programs may be stored in an information storage medium of a host computer. The host computer may be connected to a workstation by a communication network, and the software programs may be supplied from the host computer to the workstation by data communications.

In such a network application, it is possible for the workstation to download the software programs from the host computer into its own information storage medium, and to execute the downloaded software programs in a stand-alone environment. Alternatively, the software programs may not be downloaded to the workstation, but may be executed by the workstation based on real-time data communications between the host computer and the workstation.

In this case, a system which is made up of the host computer, the workstation, and the communication network corresponds to the language processing apparatus 11, 31.

While preferred embodiments of the present invention have been described using specific terms, such description is for illustrative purposes only, and it is to be understood that changes and variations may be made without departing from the spirit or scope of the following claims.

What is claimed is:

1. A language processing apparatus comprising:

function detecting means for analyzing a source program composed of a plurality of successive functions which at least partly include call instructions for calling other functions, to individually detect a plurality of functions;

program converting means for converting the source program into an object program composed of functions which can be called by different calls depending on the distance thereof; and array changing means for changing an array of functions of the object program to arrange the functions to have a maximum number of calls at a shorter call distance.

2. A language processing apparatus according to claim 1, further comprising:

call detecting means for detecting the called relationship of the functions detected by said function detecting means; and array generating means for generating an array of functions based on the called relationship detected by said call detecting means, and outputting the generated array of functions to said array changing means.

3. A language processing apparatus according to claim 1, further comprising:

call detecting means for detecting the number of times that each of the functions detected by said function detecting means call other functions, and the number of times that each of the functions detected by said function detecting means is called by other functions, and calculating the sum of the detected numbers; and array generating means for generating an array of functions in which a function with a greater sum calculated by said call detecting means is positioned more closely to the center of the array.

4. A language processing apparatus according to claim 3, wherein said array generating means comprises:

size comparing means for comparing sizes of functions which have first and second largest sums calculated by said call detecting means; and function locating means for positioning the function of the smaller size above the function of the greater size.

5. A language processing apparatus according to claim 1, further comprising:

array generating means for generating a variety of different arrays of functions detected by said function detecting means;

number accumulating means for accumulating the numbers of calls at shorter than a predetermined distance, in each of the generated arrays; and array selecting means for selecting one of the different arrays whose accumulated number of calls is the largest and outputting the selected array to said array changing means.

6. A method of processing a language, comprising the steps of:

analyzing a source program composed of a plurality of successive functions which at least partly include call instructions for calling other functions, to individually detect a plurality of functions;

converting the source program into an object program composed of functions which can be called by different calls depending on the distance thereof; and changing an array of functions of the object program to arrange the functions to have a maximum number of calls at a shorter call distance.

7. A method according to claim 6, further comprising the steps of:

after said step of analyzing, detecting the called relationship of the detected functions; and before said step of changing, generating an array of functions with a number of calls at shorter distances based on the called relationship which is detected.

8. A method according to claim 6, further comprising the steps of:

after said step of analyzing, detecting the number of times that each of the detected functions call other functions, and the number of times that each of the detected functions is called by other functions, and calculating the sum of the detected numbers; and before said step of changing, generating an array of functions in which a function with a greater calculated sum is positioned more closely to the center of the array.

9. A method according to claim 6, further comprising the steps of:

after said step of analyzing, generating a variety of different arrays of functions which are detected;

accumulating the numbers of calls at shorter than a predetermined distance, in each of the generated arrays; and before said step of changing, selecting one of the different arrays whose accumulated number of calls is the largest.

10. An information storage medium storing a program, readable by a computer, for converting a source program into an object program, said program capable of controlling said computer to perform a process comprising the steps of:

analyzing a source program composed of a plurality of successive functions which at least partly include call instructions for calling other functions, to individually detect a plurality of functions;

converting the source program into an object program composed of functions which can be called by different calls depending on the distance thereof; and changing an array of functions of the object program to arrange the functions to have a maximum number of calls at a shorter call distance.

11. An information storage medium according to claim 10, wherein said process further comprises the steps of:

detecting the called relationship of the functions detected by analyzing the source program; and generating an array of functions with a number of calls at shorter distances based on the called relationship which is detected.

12. An information storage medium according to claim 10, wherein said process further comprises the steps of:

detecting the number of times that each of the functions detected by analyzing the source program call other functions, and the number of times that each of the functions detected by analyzing the source program is called by other functions, and calculating the sum of the detected numbers; and generating an array of functions in which a function with a greater calculated sum is positioned more closely to the center of the array.

13. An information storage medium according to claim 10, wherein said process further comprises the steps of:

generating a variety of different arrays of functions which are detected by analyzing the source program;

accumulating the numbers of calls at shorter than a predetermined distance, in each of the generated arrays; and selecting one of the different arrays whose accumulated number of calls is the largest.

14. A language processing apparatus comprising:

a syntax analyzer that analyzes a source program composed of a plurality of successive functions which at least partly include call instructions for calling other functions, to individually detect a plurality of functions;

a code generator that converts the source program into an object program composed of functions which can be called by different calls depending on the distance thereof; and the code generator including an array changer that changes an array of functions of the object program to arrange the functions to have a maximum number of calls at a shorter call distance.

15. A language processing apparatus according to claim 14, wherein the code generator further comprises:

a call detector that detects the called relationship of the functions detected by said syntax analyzer; and an array generator that generates an array of functions with a number of calls at shorter distances based on the called relationship detected by said syntax analyzer, and outputting the generated array of functions to said array changer.

16. A language processing apparatus according to claim 14, wherein the code generator further comprises:

an array generator that generates a variety of different arrays of functions detected by said syntax analyzer;

a number accumulator that accumulates the numbers of calls at shorter than a predetermined distance, in each of the generated arrays; and an array selector that selects one of the different arrays whose accumulated number of calls is the largest and outputs the selected array to said array changer.

* * * * *